May 26, 1964   E. O. KLEMM ETAL   3,134,461
BRAKE MEANS FOR STEERABLE RUNNING GEAR ASSEMBLY
Filed Jan. 10, 1962   3 Sheets-Sheet 2

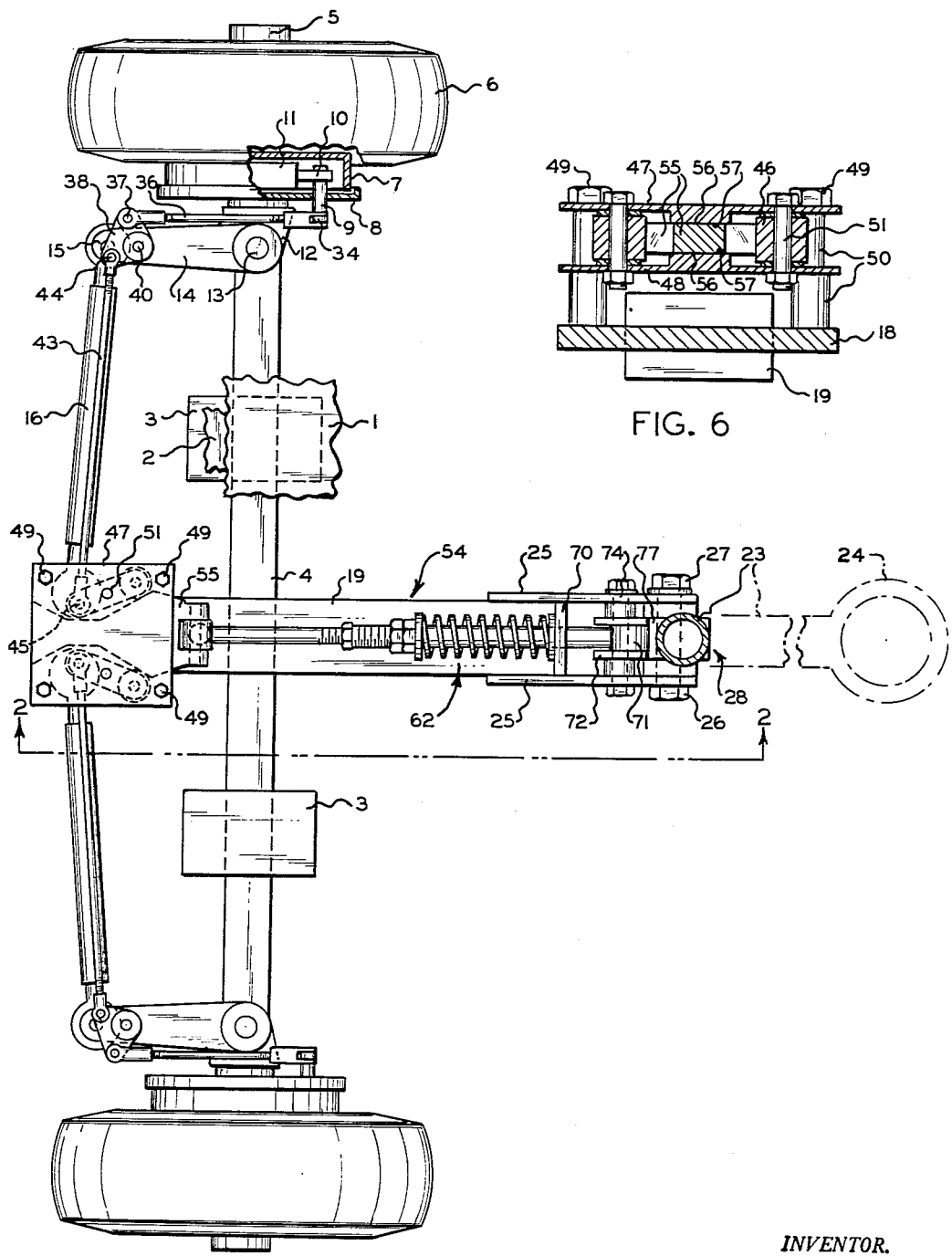

INVENTOR.
EDWIN O. KLEMM
ROY A. COLWELL
BY
ATTORNEYS

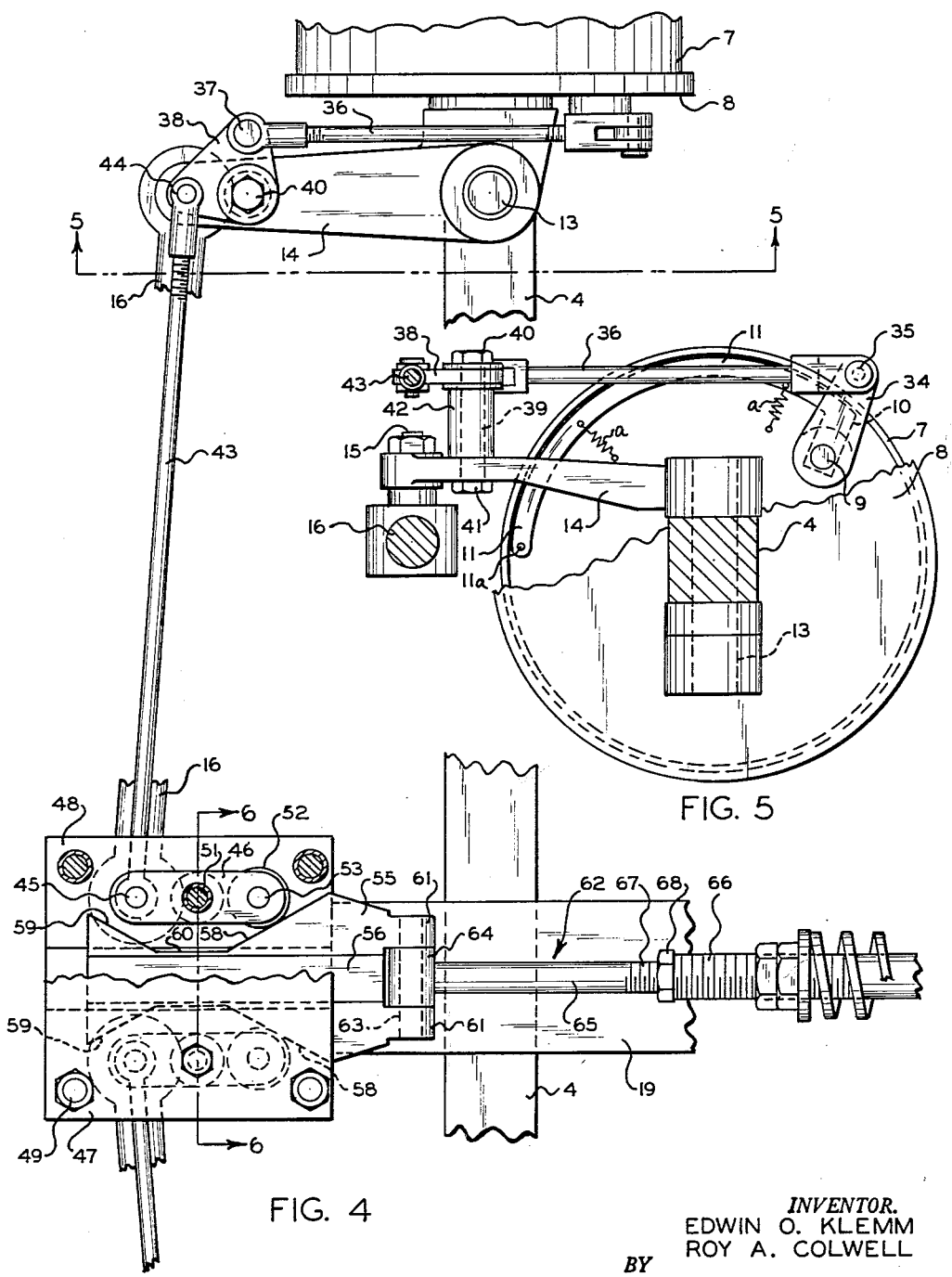

United States Patent Office 3,134,461
Patented May 26, 1964

3,134,461
BRAKE MEANS FOR STEERABLE RUNNING
GEAR ASSEMBLY
Edwin O. Klemm and Roy A. Colwell, Saginaw, Mich., assignors to Saginaw Products Corporation, Saginaw, Mich., a corporation of Michigan
Filed Jan. 10, 1962, Ser. No. 165,420
12 Claims. (Cl. 188—119)

This invention relates to wheeled vehicles of the class generally utilized for transporting various equipment, and more particularly the invention is directed to running gear assemblies for such vehicles.

Vehicles of the kind generally used for the transportation of relatively medium weight equipment ordinarily have no self-contained driving means but are adapted to be manually towed, coupled to a tractor, or coupled to one another in such manner as to form a train of carts upon which baggage and the like may be transported to and from an airplane or other carrier. The coupling means conventionally comprises a tongue that is pivotally mounted on the frame of a cart and to which is connected a tow bar which may be manually towed, or coupled either to a tractor or to the rear end of another cart. The tow bar conventionally is pivoted for swinging movements about a horizontal axis so as to permit the tow bar to be swung either upwardly or downwardly when the cart is not in use, thereby enabling the tow bar to be stored in an out-of-the-way position.

It is desirable to provide baggage carts or trucks with wheel brakes or locks in order to prevent inadvertent movement of the carts. It also is desirable that the brakes or locks be capable of being set automatically whenever the tow bar is swung to a non-coupling position, thereby eliminating the necessity of having to set the brakes or locks manually. This arrangement is particularly desirable as a safety factor since it will automatically set the vehicle's brakes in the event the vehicle accidentally should be uncoupled from a train of such vehicles.

Carts of the general class to which the invention relates have been proposed heretofore and many of them have included brake actuating devices that may be controlled or regulated to some extent from the coupling apparatus. Such prior constructions, however, have been limited to an arrangement in which the brakes are set in response to movement of the coupling member in a single direction from a coupling position. In some instances it is not possible to move the coupling member in the direction it should swing to apply the brakes, whereas in other instances, such as accidental uncoupling, the coupling member moves in a direction that is different from the direction it should move to set the brakes.

An object of this invention is to provide a wheeled vehicle having wheel brakes and means for coupling and uncoupling the vehicle to and from a towing vehicle, and wherein the setting and releasing of the brakes may be controlled by movements of the coupling member.

Another object of the invention is to provide a wheeled vehicle of the character described wherein the wheel brakes are released automatically when the coupling member is in its coupling position, but wherein the brakes automatically are applied whenever the coupling member is moved to any position other than its coupling position.

A further object of the invention is to provide brake actuated mechanism for a wheeled vehicle and wherein the brakes constantly are urged towards their applied position, thereby requiring the application of a continuous force in order to maintain the brakes in a released position.

Another object of the invention is to provide brake actuated mechanism of the character described that is adapted for use with either steerable or non-steerable wheels.

Another object of the invention is to provide a positively acting, link actuated brake controlling mechanism, thereby dispensing with the need for cables, pulleys, and the like.

Other objects and advantages of the invention will be pointed out specifically or will become apparent from the following description when it is considered in conjunction with the appended claims and the accompanying drawings, in which:

FIGURE 1 is a fragmentary top plan view, partly in section, of a wheeled vehicle having brake actuating means constructed in accordance with the invention and illustrating the position of the parts when the brakes are applied;

FIGURE 4 is a fragmentary view similar to FIGURE 1, but on an enlarged scale, illustrating the positions of the parts when the brakes are released;

FIGURE 5 is a sectional view taken on the line 5—5 of FIGURE 4; and

FIGURE 6 is a sectional view taken on the line 6—6 of FIGURE 4.

Figure 3:
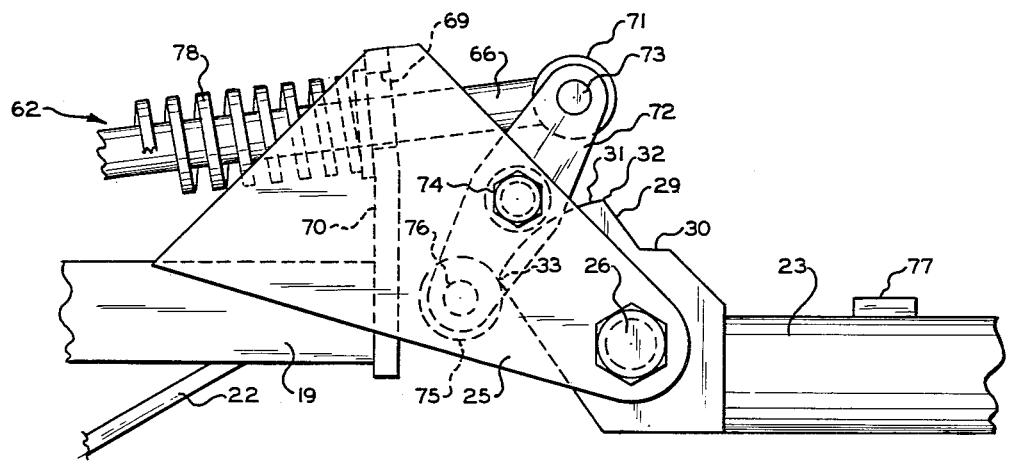
FIGURE 3 is a side elevational view, on an enlarged scale, and illustrating the relationship between the coupling member and the brake actuating mechanism in greater detail.

Apparatus constructed in accordance with the disclosed embodiment of the invention comprises a chassis or frame 1 mounted by means of rubber block springs 2 or in any other suitable manner on blocks or plate members 3 that are fixed in any suitable manner to a front axle 4 and a similar rear axle (not shown). At each end of the axle 4 is a spindle 5 on which is rotatably journaled a wheel 6, the wheel including a brake drum 7 that rotates with the wheel. Associated with each wheel is a back plate 8 fast on the spindle 5 and on which is mounted a rock shaft 9 provided with a cam 10 which is adapted to bear against a brake shoe 11 that is provided with conventional brake lining. The brake shoe 11 normally is maintained out of engagement with the brake drum 7 in a conventional manner, such as by springs a, but the brake shoe 11 is pivoted as at 11a on the back plate 8 for movement into operative engagement with the interior peripheral surface of the brake drum 7 upon rocking of the lever 9 and the cam 10 so as to exert a braking force on the wheel. The braking apparatus described thus far is conventional and, if desired, may be of the kind referred to on page 423 of "Principles of Automotive Vehicles," Army Manual TM9–8000, published January 1956.

Each of the wheels 6 is steerable and for that purpose each of the spindles 5 includes a steering knuckle 12 that is pivoted by means of a pin 13 to the axle 4, the steering knuckle being connected to a radius arm 14 that is pivoted at 15 to one end of a tie rod 16. Each tie rod 16 extends transversely of the vehicle frame and is pivoted at its inner end to a post 17 (FIGURE 2) that is supported on a plate 18 which is welded or otherwise suitably fixed to a tongue 19 so as to move with the latter. The tongue 19 is pivoted by a king bolt 20 to a block 21 that is welded or otherwise fixed to the front axle 4. The tongue includes a brace 22 through which the bolt 20 extends. The construction and arrangement of the parts thus far described are such that the tongue 19 may be pivoted in a substantially horizontal plane about the axis of the king bolt 20 so as to impart steering movements to the wheels 6 via the plate 18, the tie rods 16, the radius arms 14, and the steering knuckles 12. The steering apparatus is conventional and forms no part of the invention per se.

Means is provided to couple and uncouple the vehicle to and from a towing vehicle and comprises a tow bar 23 having a ring or other coupling devices 24 at one of its ends and being pivoted at its other end to the tongue 19 for swinging movements about a substantially horizontal plane. In the illustrative embodiment of the invention the tongue 19 is provided at its forward end with a pair of spaced apart brackets 25 that may be welded or otherwise suitably secured to the sides of the tongue 19, the forward ends of the brackets 25 apertured for the reception of a headed pivot pin 26 that is adapted to be maintained in place by the cooperation of the head of the pin and a nut 27 which may be threaded on the opposite end of the pin. As is best indicated in FIGURE 1, the tow bar 23 is of annular construction over the majority of its length, but terminates adjacent its pivoted end in a cam member 28 of such size as to fit between the brackets 25. The cam 28 also is apertured for reception of the pivot pin 26.

The rear or operating face of the cam 28 includes two linear portions 29 and 30 disposed at an obtuse angle to one another, and the free end of the cam 28 terminates in a curved dwell portion 31 terminating in rounded edges 32 and 33. The cam 28 is rigidly joined to the tow bar 23 by welding or the like so as to swing the latter about the axis of the pin 26. The assembly of the tow bar 23 and the cam 28 is swingable clockwise from the position shown in full lines in FIGURE 2 to a substantially horizontal position, as is shown in chain lines in FIGURE 2 and in full lines in FIGURE 3, and from the horizontal position to a lower or downwardly inclined position as also is indicated in chain lines in FIGURE 2. The substantially horizontal position of the tow bar 23 constitutes the coupling position of the latter whereas the other positions of the tow bar constitute non-coupling positions that may be either above or below the coupling position, depending upon the direction in which the tow bar is swung.

In keeping with the principal objectives of the invention, the apparatus includes means which are operable in response to swinging movements of the tow bar to apply or release the wheel brakes in accordance with the position to which the tow bar is swung. The brake operating means is symmetrical about the longitudinal axis of the vehicle, so a description of the operating means for one wheel brake will suffice for all.

Means for operating the brakes includes a crank arm 34 (see FIGURE 5) fast with the rock shaft 9 and pivoted by means of a pin 35 to one end of a rearwardly extending link 36, the other end of which is pivoted at 37 to a bell crank lever 38. The bell crank is journaled on a shaft 39 having a head 40 at one end and a nut 41 at its other end, the shaft 39 being mounted on the adjacent radius arm 14 of the steering apparatus. In order to maintain proper spacing between the steering arm 14 and the brake operating mechanism, the shaft 39 is surrounded by an annular sleeve 42 which seats on the steering arm 14.

A motion transmission link 43 is pivoted at one of its ends to the bell crank 38 by a pin 44 at its other end the rod 43 is pivoted by means of a pin 45 to a rock link 46 having bifurcated ends. The construction and arrangement of the brake operating parts thus far described are such that the pivots 44 and 45 are coaxial with the pivots 15 and 17, respectively, of the steering mechanism when the tow bar 23 is in its normal (coupling) position for the purpose of avoiding any adverse effects on the steering geometry of the vehicle steering mechanism which would set the brakes when the tow bar is in horizontal position and the wheels 6 are turned.

The link 46 is received between a pair of plates 47 and 48 that are bolted to the plate 18 by bolts 49 and maintained in spaced relation relative to the plate 18 and to one another by pairs of spacers 50 which surround the bolts 49. Each link 46 is pivoted between its ends by a pin 51 that is secured to the plates 47 and 48, and the forward end of each link 46 rotatably receives a roller 52 that is journaled on a pin 53 which is fixed to the link 46. The arrangement is such that pivotal movements of the links 46 causes pulling or pushing forces to be exerted on the connecting rods 43 so as to effect applying or releasing, respectively, of the wheel brakes.

Actuating apparatus designated generally by the reference character 54 is provided for actuating the brake operating mechanism in response to movements of the tow bar 23 from and to its coupling position. The actuating mechanism includes an operating cam 55 having a generally hourglass configuration in plan (see FIGURES 1 and 4) and being slideably received between the plates 47 and 48. Preferably, the upper and lower surfaces of the cam 55 are provided with flat surfaces 56 cooperating with flat surfaces 57 that are formed on the confronting faces of the plates 47 and 48 so that the wedge plate 55 has a free floating action.

The cam 55 is provided with two operating surfaces 58 which diverge in a direction forwardly of the vehicle, and two operating surfaces 59 which diverge in a direction rearwardly of the vehicle. The two pairs of operating surfaces 58 and 59 are separated by surfaces 60 which parallel the longitudinal axis of the vehicle.

The forward end of the cam 55 is provided with a pair of forwardly projecting ears 61 between which is received one end of an actuating rod generally designated 62, the actuating rod being pivoted to the cam by a pivot pin 63 which extends through both of the ears 61 and through an annular socket 64 fast on the rod 62. The actuating rod 62 preferably includes two sections 65 and 66, the section 65 being exteriorly threaded as at 67 for reception in the interiorly threaded end of the rod section 66 so as to permit the two rod sections to be adjusted relatively to one another to a desired overall length. The rod sections 65 and 66 may be maintained in a selected position of adjustment by means of a lock nut 68 that is mounted on the section 65.

The forward end of the actuating rod 62 is slideably supported in an enlarged opening 69 (see FIGURE 3) formed in a support member 70 that may be welded at the forward end of the tongue 19 and to the brackets 25. Fixed to the forward end of the rod section 66 is a socket 71 that is received between the bifurcated ends of a link 72 and is pivoted to the latter by a pivot pin 73. Between its ends the link 72 is pivoted to the brackets 25 by a pivot pin 74, and the opposite end of the link 72 also is bifurcated for the reception of a cam follower roller 75 that is journaled on a shaft 76 secured to the link 72. Tow bar 23 has a wear pad 77 thereon as shown, in view of its engagement with socket 71.

The application of a constant biasing force on the brake operating mechanism, which exerts much greater force than the combined force of all brake springs *a*, is accomplished by interposing a powerful compression spring 78 between the supporting plate 70 and a washer 79 that is slideably mounted on the actuating rod section 66. The force exerted by the spring 78 may be regulated by nuts 80 mounted on the threaded end 81 of the rod section 66.

The spring 78 reacts between the support 70 and the washer 79 so as constantly to exert a force on the actuating rod 62 tending to move the cam 55 rearwardly of its brake applying position. When the tow bar 23 is in its vertical, non-coupling position, the spring 78 will be extended to maintain the cam 55 in its rearward position, and the spring 78 also will exert a force on the link 72 tending to rock it counterclockwise, as viewed in FIGURE 2, thereby maintaining the cam follower 75 in snug engagement with the cam surfaces 29 and 30. Biasing of the link 72 to rock counterclockwise provides an effective latch for yieldably maintaining the tow bar in its vertical position.

Figure 2:
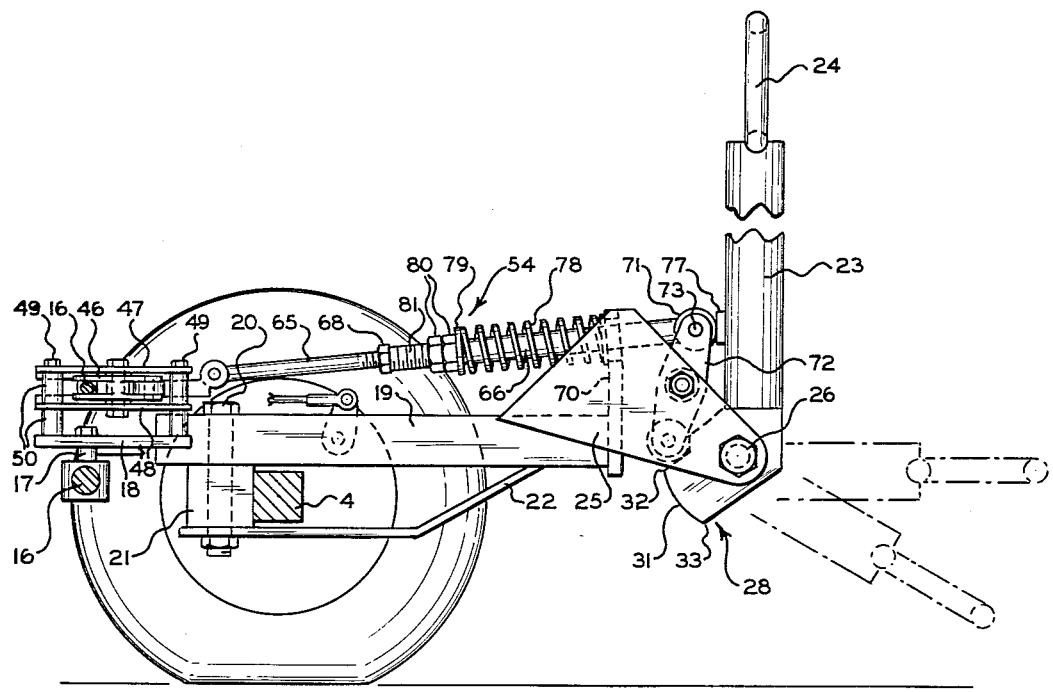
FIGURE 2 is a view partly in side elevation and partly in section of the apparatus shown in FIGURE 1, the section being taken on line 2—2 of FIGURE 1.

In the operation of the apparatus described thus far, movement of the tow bar 23 toward its vertical, noncoupling position shown in FIGURES 1 and 2 will "release" spring 78, so to speak, and permit it to immediately apply the brakes. Rearward movement of the actuating rod 62 under the influence of spring 78 (which overcomes brake springs *a*) causes corresponding movement of the cam 55 and will force the operating surfaces 58 between the rollers 52 on the links 46 so as to rock the latter in such directions as to pull the connecting rods 43 toward the longitudinal center line of the vehicle. Movement of the rods 43 towards the center line of the vehicle will rock the bell cranks 38 about their pivots 40 to exert a rearward pulling force on the links 36, thereby rocking the cranks 34 and the rock shafts 9 and applying the wheel brakes to restrain rotation of the wheels 6.

When the tow bar 23 is lowered to its horizontal, coupling position, the cam surfaces 33 and 31 on the actuating cam 28 will bear against the roller 75 on the link 72 and pivot the latter clockwise, as viewed in FIGURES 2 and 3, thereby pulling the actuating rod 62 and the cam 55 forwardly. Forward movement of the cam 55 will withdraw the wedging force exerted by the cam on the links 46, thereby enabling the return springs *a* of the brake mechanisms to withdraw the brake shoes 11 from engagement with the brake drums 7 so as to release the brakes and permit free rotation of the wheels 6. If, for any reason, the springs *a* of the brake mechanism fail or are inoperative to effect release of the brakes, forward movement of the cam 55 will cause the cam surfaces 59 to bear against the links 46 to rock them in such directions as to push the connecting rods 43 toward the lateral edges of the vehicle, thereby assuring a positive actuation of the brakes.

In the coupling position of the tow bar 23, the corner 33 of the cam 28 bears against the cam follower 75 at such position as to prevent rocking movement of the link 72 in a counterclockwise position, as viewed in FIGURE 3, as long as the tow bar 23 remains in its substantially horizontal position. Accordingly, the actuating mechanism 54 is incapable of applying the vehicle brakes as long as the tow bar is in its coupling position.

In the event the tow bar 23 is uncoupled from its towing vehicle and is permitted to swing downwardly to a lower, non-coupling position, the cam 28 will be rocked clockwise, as viewed in FIGURE 3, withdrawing the cam surfaces 31 and 33 from the cam follower 75, thereby enabling the spring 78 to propel the actuating member 62 rearwardly and effect actuation of the vehicle brakes in the same manner that previously has been described. Thus, the vehicle brakes will be applied whenever the tow bar is in a non-coupling position, regardless of whether the tow bar is swung upwardly or downwardly from its coupling position, and will be applied virtually immediately under the influence of spring 78.

A modified embodiment of the invention is possible in which spring 78 is removed. However, in this case while the tow bar 23 would apply the brakes through engagement of pad 77 with socket 71, it could not do so at substantially the commencement of the upward swing of tow bar 23 and, further, the brakes would not be applied when the tow bar simply dropped from the coupling position.

The disclosed embodiment is representative of a presently preferred form of the invention, but is intended to be illustrative rather than definitive thereof. The invention is defined in the claims.

We claim:

1. In a steerable, braked running gear assembly; frame means including transversely extending axle means with ground engaging, longitudinally disposed wheel members at opposite ends thereof; brake means for said wheel members; steering tongue means, extending longitudinally in normal position, pivotally mounted by said frame means for swinging movements in a generally horizontal plane; tie rod means having an inner end connected to said steering tongue means and including a link connected to said wheel member to steer the same when the steering tongue means is turned out of longitudinal alignment; and operating means movable with said steering tongue means for applying said brakes, including rod means with one pivotal end in substantially vertically coaxial alignment with the inner end connection of said tie rod means and the other end in substantially vertically coaxial alignment with an outer lateral pivot of said tie rod means when the brake means is not applied.

2. In a steerable, braked running gear assembly; frame means including transversely extending axle means with ground engaging, longitudinally disposed wheel members at opposite ends thereof; brake means for said wheels members; steering tongue means, extending longitudinally in normal position, pivotally mounted by said frame means for swinging movements in a generally horizontal plane; tie rod means having an inner end connected to said steering tongue means and including a link conected to said wheel member to steer the same when the steering tongue means is turned out of longitudinal alignment; a coupling member pivotal on said tongue from a generally horizontal coupling position to other positions; operating means movable with said steering tongue means for applying said brakes including rod means with one pivotal end in substantially vertically coaxial alignment with the inner end connection of said tie rod means and another end in substantially vertically coaxial alignment with an outer lateral pivot of said tie rod means when the brake means is not applied; means constantly biasing said operating means and tending to actuate said operating means to apply the brake means; and means for preventing said brake means from being applied when the coupling member is in a coupling position.

3. The combination defined in claim 2 in which said operating means includes a wedge bar mounted on and reciprocable on said steering tongue means for moving said rod means.

4. In a steerable, braked running gear assembly; frame means including transversely extending axle means with ground engaging, longitudinally disposed wheel members at opposite ends thereof; brake means for at least one of said wheel members including a brake operating member on said wheel member; a steering knuckle for said wheel member; steering tongue means, extending longitudinally in normal position, pivotally mounted by said frame means for swinging movements in a generally horizontal plane; a tie rod having an inner end pivotally connected to said steering tongue means and an outer end pivotally connected to said steering knuckle to steer the wheel when the steering tongue means is turned out of longitudinal alignment; operating means mounted on and movable with said steering tongue means for applying said brakes including a pivotal rod with one pivotal end in substantially vertically coaxial alignment with the inner end connection of said tie rod means and the other pivotal end in substantially vertically coaxial alignment with the outer pivot of said tie rod means when the brake means is not applied; and means pivotally joining said rod and brake operating member on the wheel member.

5. The combination defined in claim 4 in which a bell crank lever pivotal on said steering knuckle joins said rod and means joining said rod and brake operating member on the wheel member.

6. In a steerable, braked running gear assembly; frame means including transversely extending axle means with ground engaging, longitudinally disposed, steerable wheel members at opposite ends thereof; brake means for said wheel members; steering tongue means, extending longitudinally in normal position, pivotally mounted by said frame means for steering swinging movements in a generally horizontal plane; tie rod means connecting said tongue means with said wheel members for imparting steering movements thereto; longitudinally extending push bar means movable longitudinally fore and aft on said tongue means; transversely extending rigid links connecting said push bar means and brake means for actuating and applying said brake means when the push bar means is moved longitudinally; biasing spring means reactable between said push bar means and tongue means for normally urging said push bar means longitudinally in a direction to actuate and apply said brake means; a coupling member pivotal vertically on said tongue means from a generally horizontal coupling position to other positions; and means exerting a force on said push bar means overcoming said biasing spring means when the push bar means is in substantially horizontal towing position permitting said biasing spring means to move said push bar means longitudinally to actuate and apply said brakes when the coupling member is pivoted to non-horizontal positions.

7. The combination defined in claim 6 in which generally vertically extending link means is pivotally connected to the fore end of said push bar means and is pivoted by said tongue means so that the lower end thereof is in the vertical path of travel of said coupling member; said coupling member having a cam surface thereon and said biasing spring means comprising a coil spring encircling said push bar means and biased between a collar thereon and a wall on said tongue means having a bore through which said push bar extends.

8. The combination defined in claim 6 in which said push bar means has a wedge-shaped cam surface thereon engaging levers pivotal on said tongue means and connected with said links.

9. In a steerable, braked running gear assembly; frame means including transversely extending axle means with ground engaging, longitudinally disposed, steerable wheel members at opposite ends thereof; brake means for said wheel members; steering tongue means, extending longitudinally in normal position, pivotally mounted by said frame means for steering swinging movements in a generally horizontal plane; tie rod means connecting said tongue means with said wheel members for imparting steering movements thereto; longitudinally extending push bar means movable fore and aft on said tongue means; transversely extending rigid links connecting with said brake means for actuating and applying said brake means when the push bar means is moved longitudinally; cam and follower means connecting said links and push bar means; biasing spring means for normally urging said push bar means longitudinally in a direction to actuate and apply said brake means; a coupling member pivotal vertically on said tongue means from a generally horizontal coupling position to other positions; and means exerting a force on said push bar means overcoming said biasing spring means when the push bar means is in substantially horizontal towing position permitting said biasing spring means to move said push bar means longitudinally to actuate and apply said brakes when the coupling member is pivoted to non-horizontal positions.

10. In a steerable, braked running gear assembly; frame means including transversely extending axle means with ground engaging, longitudinally disposed, steerable wheel members at opposite ends thereof having steering knuckles thereon; brake means for said wheel members; steering tongue means, extending longitudinally in normal position, pivotally mounted by said frame means for steering swinging movements in a generally horizontal plane; transversely extending tie rods pivotally connected at their inner ends to said tongue means and pivotally connected at their outer ends to said steering knuckles for imparting steering movements thereto; longitudinally extending push bar means movable fore and aft on said tongue means; transversely extending rigid links connecting said push bar means and brake means for actuating and applying said brake means when the push bar means is moved longitudinally, comprising rods with their inner ends pivotally connected so that they are in vertical coaxial alignment with the inner end pivot connections of said tie rods and with their outer ends pivotally connected so that they are in vertical coaxial alignment with the outer pivot connections of said tie rods when the brake means are not applied; biasing spring means reactable between said push bar means and tongue means for normally urging said push bar means longitudinally in a direction to actuate and apply said brake means; a coupling member pivotal vertically on said tongue means from a generally horizontal coupling position to other positions; and means exerting a force on said push bar means overcoming said biasing spring means when the push bar means is in substantially horizontal towing position permitting said biasing spring means to move said push bar means longitudinally to actuate and apply said brakes when the coupling member is pivoted to non-horizontal positions.

11. In a steerable, braked running gear assembly; frame means including transversely extending axle means with ground engaging, longitudinally disposed, steerable wheel members at opposite ends thereof; brake means for said wheel members; steering tongue means, extending longitudinally in normal position, pivotally mounted by said frame means for steering swinging movements in a generally horizontal plane; means connecting said tongue means with said wheel members for imparting steering movements thereto; longitudinally extending push bar means movable longitudinally fore and aft on said tongue means; rigid links connecting said push bar means and brake means for actuating and applying said brake means when the push bar means is moved longitudinally; biasing spring means for normally urging said push bar means longitudinally in a direction to actuate and apply said brake means; a coupling member pivotal vertically on said tongue means from a generally horizontal coupling position to other positions; and means exerting a force on said push bar means overcoming said biasing spring means when the push bar means is in substantially horizontal towing position permitting said biasing spring means to move said push bar means longitudinally to actuate and apply said brakes when the coupling member is pivoted to non-horizontal positions.

12. In a steerable, braked running gear assembly; frame means including transversely extending axle means with ground engaging, longitudinally disposed, steerable wheel members at opposite ends thereof; steering knuckles for said wheel members; brake means for said wheel members; steering tongue means, extending longitudinally fore and aft in normal position, pivotally mounted by said frame means intermediate the ends of said tongue means for steering swinging movements in a generally horizontal plane; tie rod means connecting the rear end of said tongue means with said wheel members for imparting steering movements thereto; longitudinally extending push bar means movable longitudinally fore and aft on said tongue means; rigid links connecting said push bar means and brake means for actuating and applying said brake means when the push bar means is moved longitudinally; said links comprising transversely extending rods, pivotal lever members connecting said rods and push bar mounted on the rear end of said tongue means, pivotal lever members mounted on said steering knuckles, and rods connecting said lever members on the steering knuckles and brake means; biasing spring means for normally urging said push bar means longitudinally in a direction to actuate and apply said brake means; a coupling member pivotal vertically on said tongue means from a generally horizontal coupling position to other positions; and means exerting a force on said push bar means overcoming said biasing spring means when the push bar means is in substantially horizontal towing position permitting said biasing spring means to move said push bar means longitudinally to actuate and apply said brakes when the coupling member is pivoted to non-horizontal positions.

(References on following page)

References Cited in the file of this patent

UNITED STATES PATENTS

| | | | |
|---|---|---|---|
| 999,952 | Blaska | Aug. 8, | 1911 |
| 1,196,724 | Sherman | Aug. 29, | 1916 |
| 1,236,847 | King | Aug. 14, | 1917 |
| 1,733,544 | Langdon | Oct. 29, | 1929 |
| 1,923,538 | Hille | Aug. 22, | 1933 |
| 2,149,624 | Owen | May 7, | 1939 |
| 2,934,176 | Farkas | Apr. 26, | 1960 |
| 3,005,640 | Cole | Oct. 24, | 1961 |

FOREIGN PATENTS

| | | | |
|---|---|---|---|
| 834,503 | Germany | Mar. 20, | 1952 |
| 843,818 | Germany | July 14, | 1952 |